(12) United States Patent
Ennis

(10) Patent No.: US 9,641,247 B2
(45) Date of Patent: May 2, 2017

(54) SYSTEM AND METHOD FOR MONITORING UNKNOWN RESOURCES

(75) Inventor: Shawn Patrick Ennis, St. Charles, IL (US)

(73) Assignee: Monolith Technology Holdings, LLC, Frisco, TX (US)

( * ) Notice: Subject to any disclaimer, the term of this patent is extended or adjusted under 35 U.S.C. 154(b) by 378 days.

(21) Appl. No.: 13/099,430

(22) Filed: May 3, 2011

(65) Prior Publication Data

US 2012/0284391 A1 Nov. 8, 2012

(51) Int. Cl.
*H04L 29/06* (2006.01)
*H04B 10/079* (2013.01)
*H04B 10/077* (2013.01)

(52) U.S. Cl.
CPC ..... *H04B 10/0793* (2013.01); *H04B 10/0773* (2013.01)

(58) Field of Classification Search
CPC ............ H04B 10/0773; H04B 10/0793; G06F 15/173
USPC ........................................................ 709/224
See application file for complete search history.

(56) References Cited

U.S. PATENT DOCUMENTS

| | | | | |
|---|---|---|---|---|
| 5,627,766 A | * | 5/1997 | Beaven | G06F 11/0715 370/241 |
| 5,969,833 A | * | 10/1999 | Jensen | H04B 10/0771 398/167 |
| 6,449,739 B1 | * | 9/2002 | Landan | G06F 11/323 709/224 |
| 7,310,135 B2 | * | 12/2007 | Wisseman | H04B 10/00 356/73.1 |
| 2002/0198985 A1 | * | 12/2002 | Fraenkel | G06F 11/3419 709/224 |
| 2008/0165348 A1 | * | 7/2008 | Kim et al. | 356/73.1 |

* cited by examiner

*Primary Examiner* — Andrew Chriss
*Assistant Examiner* — Rasha Fayed
(74) *Attorney, Agent, or Firm* — Calfee, Halter & Griswold LLP

(57) ABSTRACT

The present invention provides a method and system for inferential monitoring of a resource. The method according to one embodiment of the invention comprises selecting a given resource, the selected given resource including one or more monitorable parts and at least one unmonitorable part, and performing one or more tests on the one or more monitorable part to determine a status of the one or more monitorable parts. Results from the one or more tests of the one or more monitorable parts is correlated with the at least one unmonitorable part to determine a status of the unmonitorable part on the basis of the correlation.

19 Claims, 7 Drawing Sheets

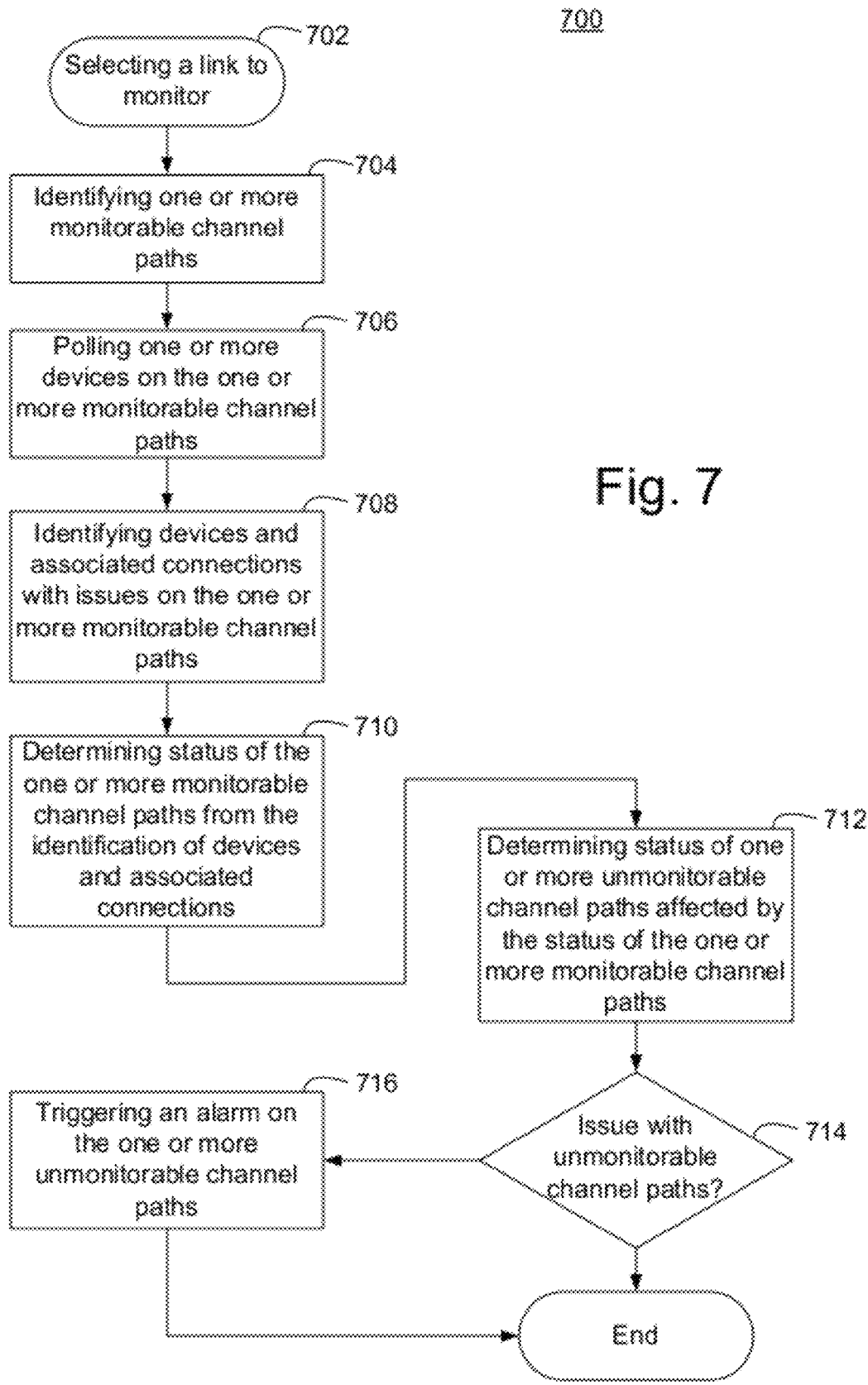

SYSTEM AND METHOD FOR MONITORING UNKNOWN RESOURCES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to inferential modeling of inaccessible resources using accessible resources.

BACKGROUND OF THE INVENTION

Dark fiber is typically optical fiber infrastructure that is currently in place but is unused. For example, some electric utilities have installed optical fiber cable where they already possess right of way access for the installation of power lines; the expectation being that they can lease the infrastructure to telephone or cable TV companies, or use the fiber cables to interconnect their own offices. To the extent that these installations are unused, they are described as dark fiber. Often times, companies lay a significantly greater amount fiber than current capacity requires to curb costs of having to lay additional fiber in the future, as well as in anticipation of future expansion and utilization.

Conventionally, telecommunication service providers or companies ("telcos") own or lease dark high capacity fiber optic lines. The dark fibers can be leased to individuals or other companies who want to establish optical connections among their own locations, e.g., private wide area networks ("WANs"). These fiber cables are sometimes re-sold or leased to a fiber lessee with service level agreements ("SLAs"), but without any attached technology; these dark fibers are typically lit by the fiber lessee. In these instances, the fiber is not controlled by the fiber owner/lessor, e.g., the phone company. Instead, the fiber lessee provides the necessary components to make the fiber functional. The fiber owner, however, must provide SLA guarantees without visibility into the dark fiber because a given owner does not have the necessary access to the dark fiber to monitor such service levels. There is thus a need to monitor dark fiber (as well as other resources lacking direct visibility) indirectly by inferential modeling and analysis.

SUMMARY OF THE INVENTION

The present invention provides a methods, systems and computer readable media for inferential monitoring of a link. A method for inferential monitoring of a link according to one embodiment of the present invention comprises selecting a given link, the selected given link including one or more monitorable channels and at least one unmonitorable channel, performing one or more tests on the one or more monitorable channels and determining a status of the one or more monitorable channels on the basis of the one or more tests. The results from the one or more tests of the one or more monitorable channels are correlated with the unmonitorable channel and a status of the unmonitorable channel is determined on the basis of the correlation.

The link according to one embodiment is a segment of dark fiber optic cable, and may carry various types of traffic, such as VoIP traffic across a voice over internet protocol connection. The method may determine an overall status of the entire link on the basis of the correlation, which could be the result of the unmonitorable channel(s) becoming inaccessible. In addition to the foregoing, an issue may be determined with the one or more monitorable channels. Accordingly, an issue may be determined with the unmonitorable channel on the basis of the determination of an issue with the one or more monitorable channels. Furthermore, determining an issue with the entire link may be made on the basis of the determination of an issue with the one or more monitorable channels.

According to one embodiment of the invention, a method of inferential monitoring comprises determining a status of a segment of the one or more monitorable channels and determining a status of a segment of the unmonitorable channel corresponding to the segment of the one or more monitorable channels. Determining the status of the one or more monitorable channels may comprise determining a status of one or more devices connected to the one or more monitorable channels. A root cause analysis technique may be used in determining the status of the unmonitorable channel.

Embodiments of the invention further contemplate computer readable media comprising program code for executing the above-described methods, as well as methods described herein.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 7 presents a flow diagram illustrating a method for inferential link and device monitoring according to one embodiment of the present invention.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
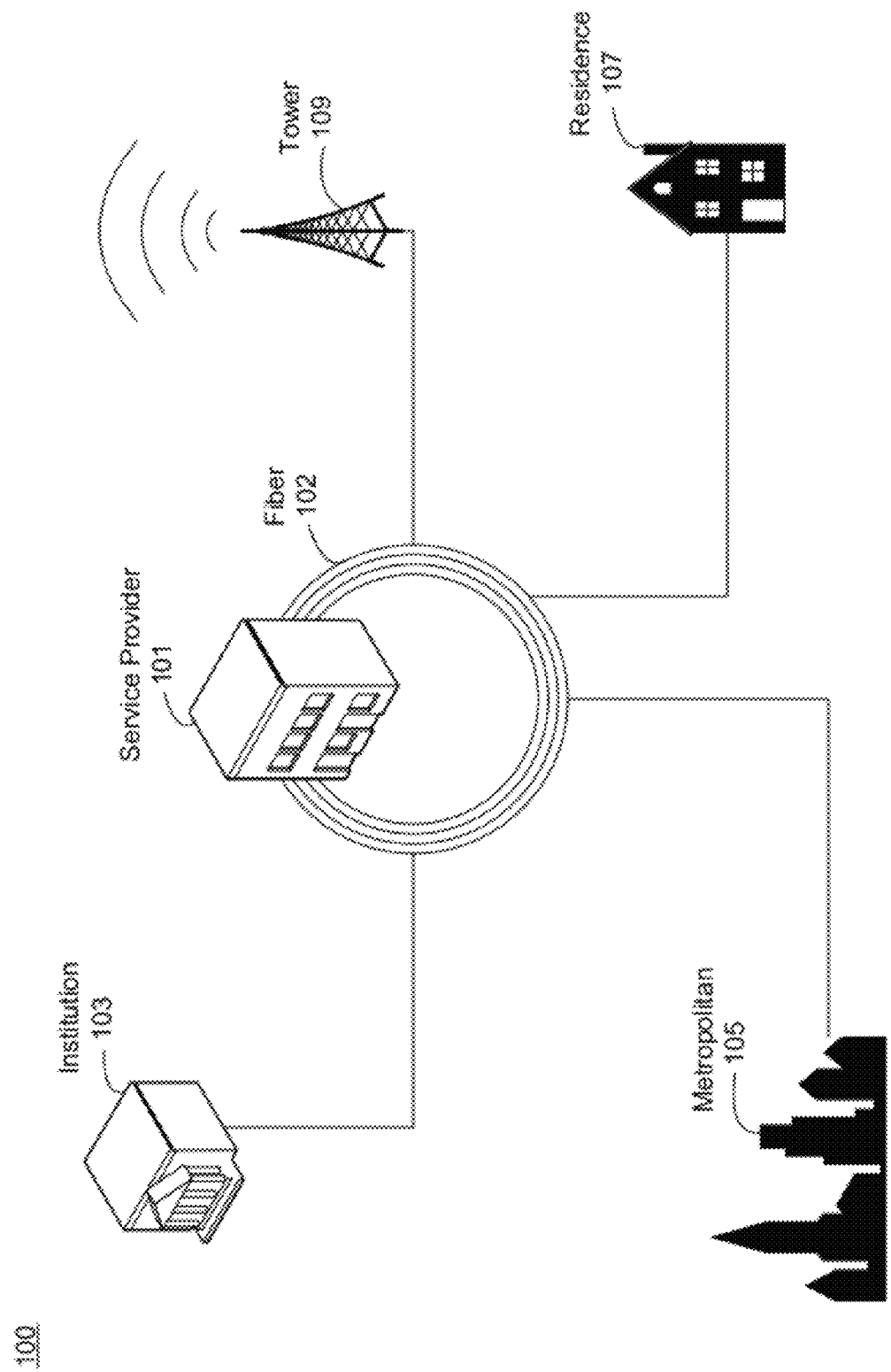
FIG. 1 presents a block diagram illustrating a high-level view of a networked computing environment according to one embodiment of the present invention.

FIG. 1 illustrates one embodiment of a system 100 including service providers 101, institutions 103, metropolitan areas 105, residences 107 and towers 109, e.g., cellular base station. Service provider 101 may be a telco, utility company or other entity possessing optical fiber cable lines ("fiber") 102 for resale or lease. Portions of fiber 102 may be dark fiber that can be leased to institutions 103 (e.g., colleges and universities), metropolitan areas 105, residences 107 (e.g., buildings or condominium associations) or wireless providers to serve as a backhaul for a network of cellular towers 109. A given one of the service provider 101, institution 103, metropolitan area 105, residence 107 and tower 109 may include computers, workstations, terminals, servers and other computing devices at these locations.

Leasing of dark fiber within fiber 102 in accordance with one embodiment is limited to selling physical access to fiber cables, which may be provided as a single unit or group of "unlit" fiber optic cables. Fiber that is lit by the lessee may also subsequently be referred to as dark fiber, as the owner/lessor is unaware of the manner in which the resource is being utilized, which may include, but is not limited to, private networking, Internet access or Internet infrastructure networking.

The lessee of the dark fiber 102 is generally responsible for providing equipment at the ends of the dark fiber to enable functionality of the connection. This equipment may come in the form of multiplexing equipment specific to the application to which the lessee intends to use the resource. For example, short distance dark fiber can use Coarse Wavelength Division Multiplexing ("CWDM") while long distances may generally use Dense Wavelength Division Multiplexing ("DWDM"). The multiplexing equipment may allow the lessee of the dark fiber to send one or more streams or channels of combined voice and data over a single fiber.

Dark fiber may be lit and used to establish networks by lessees of the fiber 102, which may be any suitable type of network allowing for the high-speed transport of data and other telecommunications traffic. In one embodiment, the network may be the Internet or other IP network, following known Internet protocols for data communication, or any other communication network, e.g., any local area network (LAN), wide area network (WAN) connection or a metropolitan area network ("MAN"). Institution 103 and residence 107 may lease dark fiber from fiber 102 for LAN and WAN network connections, while a metropolitan area 105 may create a MAN that spans a city or multiple campuses. Tower 109 may establish or extend a WAN connection via Code Division Multiple Access ("CDMA"), Global System for Mobile Communications ("GSM"), Enhanced Data rates for GSM Evolution ("EDGE"), $3^{rd}$ Generation Mobile Communications ("3G"), $4^{th}$ Generation Mobile Communications ("4G"), "General Packet Radio Service ("GPRS"), or any mobile telecommunication or wireless standard to transmit voice and data. Wireless voice and data transmissions may include voice telephone, mobile Internet access, video calls and mobile TV.

Figure 5:
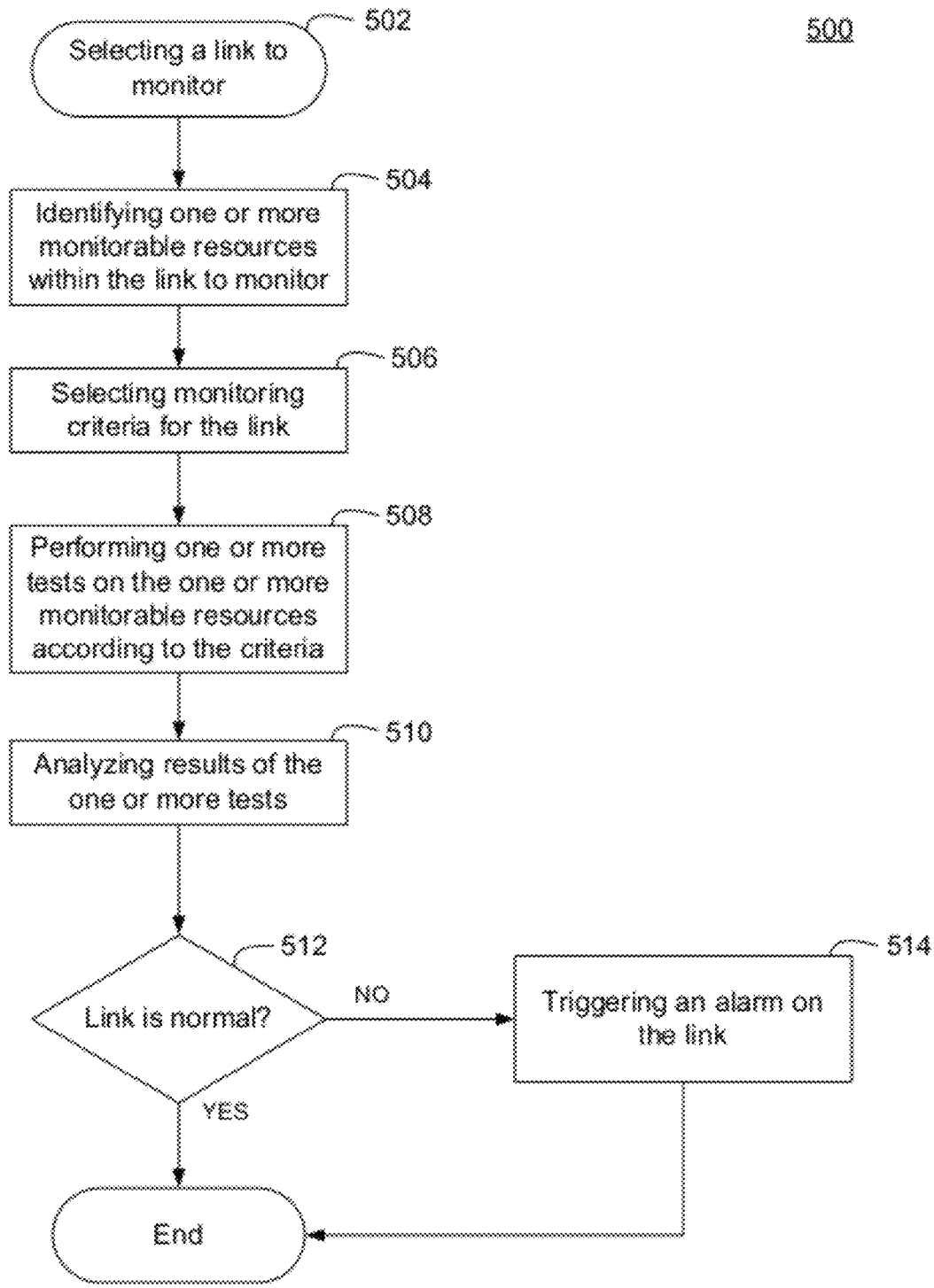
FIG. 5 presents a flow diagram illustrating a method for inferential link monitoring according to one embodiment of the present invention.
Figure 6:
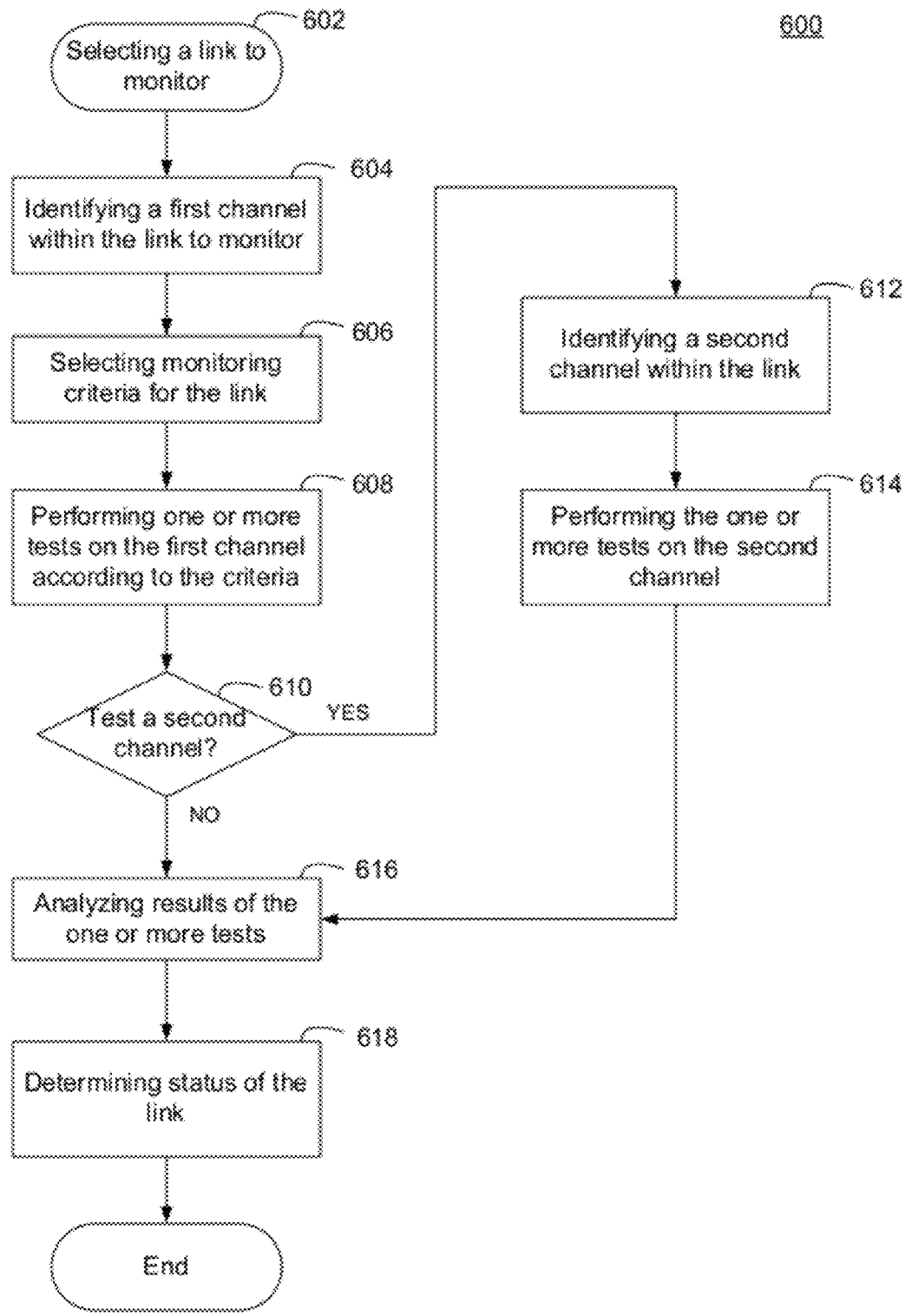
FIG. 6 presents a flow diagram illustrating a method for inferential link monitoring on the basis of multiple known resources according to one embodiment of the present invention.

Service provider 101 may monitor the SLA of leased fiber 102 through methods described in further detail herein with respect to the description of FIG. 5-7. Monitoring is not limited to monitoring dark fiber but may also include monitoring any line, service or device, such as "lit" optical fibers, telephone lines, Digital Subscriber Line ("DSL"), Integrated Services Digital Network ("ISDN"), coaxial cables, Voice over Internet Protocol ("VoIP") services, video conferencing lines, or any environment with unmonitorable network topology elements or resources.

Figure 2:
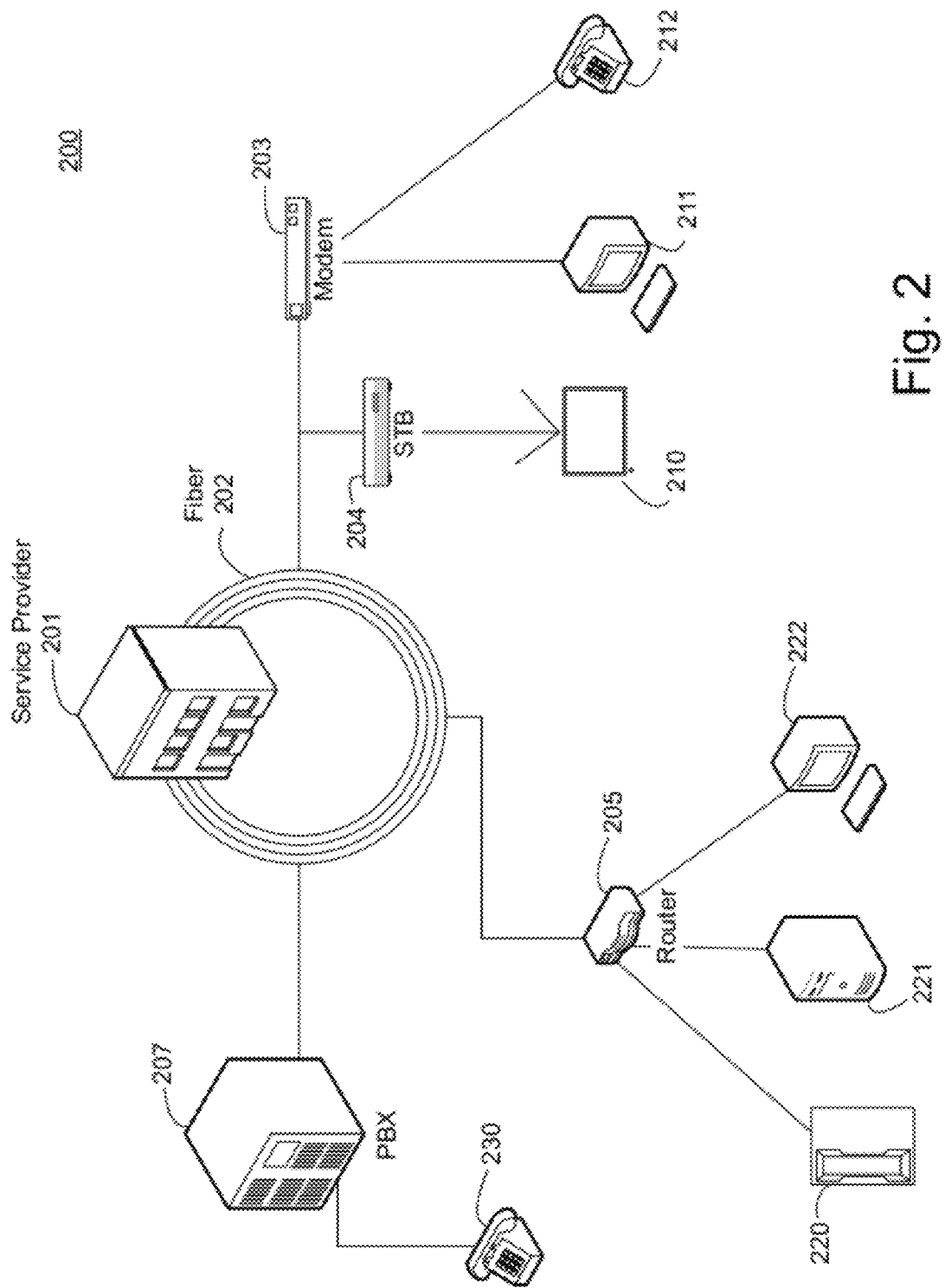
FIG. 2 presents a block diagram illustrating a networked computing system according to one embodiment of the present invention.

FIG. 2 presents a diagram illustrating devices interconnected by a fiber system. According to the embodiment of FIG. 2, the system 200 includes service provider 201, fiber optic lines 202, modem 203, set-top box ("STB") 204, router 205 and Private Branch Exchange ("PBX") 207. In one embodiment, dark fiber connections leased from a collection of available fiber 202 may be used for a connection to modem 203 and STB 204 to provide residential services. STB 204 may be connected to television 210, whereas the modem 203 may be connected to a computer 211 and telephone 212. The modem may be a cable, DSL, voice or any other suitable modem. In one embodiment, telephone 212 may additionally be connected to a phone adapter or any suitable device for adapting a telephone to the leased dark fiber. In another embodiment, a third party service provider may lease the dark fiber to provide television, Internet and voice telephone services (commonly referred to as a "triple play" package) to residential customers.

In one embodiment, a router 205 may be connected to devices typically found at within the enterprise, such as telephone 220, server 221 and computer 222. PBX 207 may be connected to one or more telephone 230. Voice, data, or combinations thereof may all take advantage of dark fiber. Some organizations such as government or educational institutions may lease dark fiber from service provider 201 as this infrastructure offers significantly higher price performance ratios and may be sought out by entities requiring high performance interconnections between endpoints. In another embodiment, the above-described third party communication service provider may additionally provide business services such as high speed Ethernet and private line services between and within router 205 and PBX 207 using dark fiber.

Dark fiber may be utilized to established private network and telecommunication connections between sites within the dark fiber network. A dark network may be used between data centers and at secure locations or other sites when establishing secure private networks. For example, a financial or government institution may desire to create secure private networks for internal communications. Dark fiber lines may also provide secure voice communications via PBX and VoIP systems.

PBX 207 may provide a private telephone network for use within an enterprise. Users of the PBX 207 may share a certain number of outside lines for making telephone calls external to the PBX 207. The PBX 207 may make connections among internal telephones of a private organization, as well as connect such endpoints to the public switched telephone network ("PSTN") via trunk lines.

VoIP may enable individuals to use the Internet as the transmission medium for telephone calls by sending voice data in packets using IP rather than by traditional circuit transmissions of the PSTN. However, VoIP telephone systems are capable of being susceptible to vulnerabilities such as denial-of-service attacks, data harvesting, conversation recordings and voice mailbox break-ins. Many consumer VoIP solutions do not support encryption. As a result, it is relatively easy to eavesdrop on VoIP calls and even change their content. Attackers with packet sniffers may easily intercept VoIP conversations. Dark fiber connections are capable of providing a direct line between lessee-specified points and protection against such outside intrusion.

The number of devices as illustrated by FIG. 2 may vary; those of skill in the art recognize that suitable devices not limited to the amount and type as illustrated.

Figure 3:
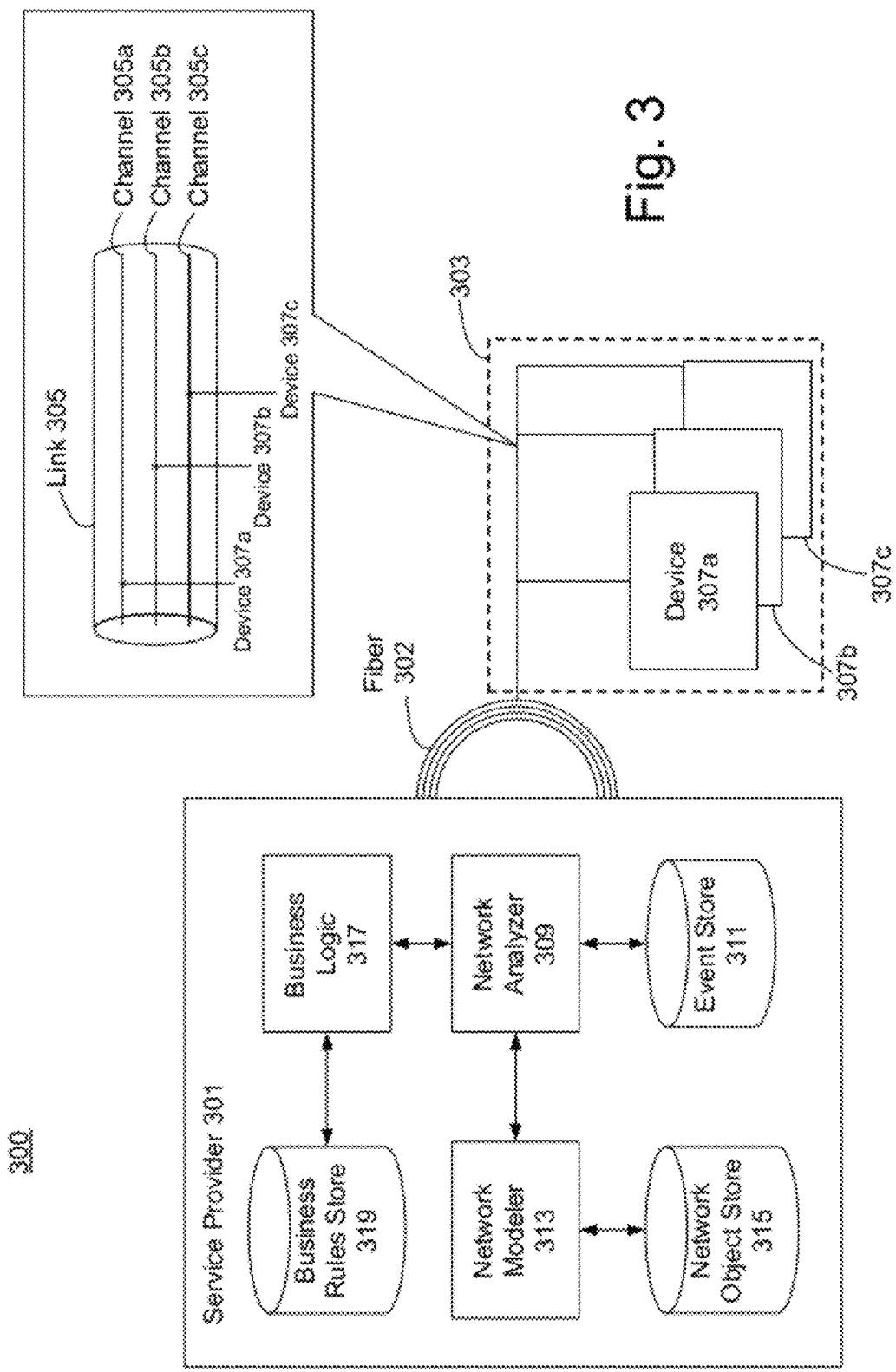
FIG. 3 presents a block diagram illustrating a monitoring system according to one embodiment of the present invention.

FIG. 3 presents a block diagram illustrating a system 300 comprising components for dark fiber monitoring according to one embodiment of the present invention. System 300 includes service provider 301, fiber 302, link 305 and devices 307a, 307b and 307c (collectively referred to as 307) within an institution 303. Institution 303 may lease a dark fiber line, shown as link 305, from fiber 302 that a service provider 301 makes available. A link may refer to a fiber strand within a cable or the entire cable itself. Link 305 may comprise one or more channels 305a, 305b and 305c, also referred to as bands. Channels 305a, 305b and 305c may be sections of link 305 provisioned to provide bandwidth for a plurality of non-overlapping transmissions on a single link. A channel may be a partition, a communication frequency or a multiplexing within a link and, according to one embodiment; each channel may be capable of transmitting data independent from other channels.

In order to be competitive, as well as to comply with respect to regulations and SLAs, service provider 301 may be obliged to maintain an optimal or minimal level of service, which may include including minimizing service disruptions and reducing the duration of disruptions when they do occur. Disruptions may be caused by a number of different events, such as malfunctioning network elements (e.g. software glitch in a switch or a transmitter), power outages, and damage or breaks in fiber cables.

Once institution 303 leases and sets up link 305, however, service provider 301 may not have any control or access to monitor link 305. An inefficient method for monitoring link 305 may involve directly monitoring the link by installing monitoring equipment at institution 303 or at sites which have been set up and attached to the leased dark fiber connection 305 by institution 303. Directly monitoring the link 305 can be costly, intrusive, and may not be feasible as it may hinder or otherwise affect performance of the leased dark fiber 305.

According to embodiments of the present invention, service provider 301 provides for inferential modeling and indirect monitoring of link 305. Link 305 may be remotely monitored by service provider 301 (e.g., at a central office). According to one embodiment, service provider 301 reserves a small portion of link 305 for the purpose of monitoring the link without interfering with institution 303's normal operations. A small portion of link 305 may include one or more of channels 305a, 305b and 305c within the link 305. By monitoring the health of a single channel 305a, 305b and 305c on the link 305, the service provider 301 may determine the health of the overall link 305. Similarly, a failure in a given channel 305a, 305b and 305c may indicate a failure in the other channels comprising the given link 305.

For example, service provider 301 may reserve channel 305a on the dark fiber link 305. Device 307a may be owned by service provider 301 and connected to channel 305a to provide communication with service provider 301. Communication between device 307a and service provider 301 may include a series of polls, ping tests, status queries or any exchange of information that would indicate the health of channel 305a. Devices 307a, 307b and 307c may be any of the devices illustrated in FIG. 2 or components within the infrastructure of devices (not illustrated).

According to one embodiment, for a given link of dark fiber leased by service provider 301, the service provider 301 reserves one or more channels of the dark fiber links. Specification of the reserved channel(s) may be included in the leasing agreements made between service provider 301 and institution 303. The remainder of the link 305, e.g., channels 305b and 305c, may be fully controlled by institution 303 and set up for transmitting voice and data to device 307b and 307c. In another embodiment, service provider 301 may also monitor a second link running in conjunction with link 305. The second link may be an un-leased dark fiber link similar to link 305 and may be monitored in the same manner as if monitoring a channel 305a, 305b and 305c within link 305.

To implement the above-described monitoring scheme, service provider 301 according to one embodiment comprises a network analyzer 309, event store 311, network modeler 313, network object store 315, business logic 317 and business rules store 319. Events or monitoring information from communications between service provider 301 and one or more devices on a monitored channel may be stored in event store 311. Events may indicate fiber segments within monitored channels that are in alarm or operating abnormally. Normal operating conditions may include criteria based on, but not limited to, SLA, connectivity, throughput, or link quality, etc. Network object store 315 may record objects or devices on corresponding monitored channels, and the links between the devices. Network modeler 313 may retrieve information from network object store to dynamically model a topology of a monitored channel. In addition to topology, services and sub-services corresponding to monitored devices attached to a monitored channel may also be modeled by network modeler 313. The topology modeled by network modeler 313 may be used by network analyzer 309 to infer events taking place on the link 305.

Network analyzer 309 may retrieve or otherwise retrieve fiber segment events (e.g. on channel 305a) from event store 311 to infer and generate fiber segment events or alarms for unmonitorable channels (e.g., channel 305b and 305c). Inference of fiber segment events for unmonitorable channels may be made on the basis of a Root Cause Analysis ("RCA") technique. The service provider 301 may use RCA to identify a problem or non-conformance state by determining the "root cause" of the problem. A root cause represents the source of a fundamental breakdown or failure of a process and may be used as a systematic approach to get to the true root causes of fiber segment problems. The analysis process may involve data collection, cause charting, root cause identification and recommendation generation and implementation. An example of root cause analysis performed for unmonitorable channels may begin with an analysis as to whether a problem stems from a cut fiber to power failure, network element failure, or other cause. Fiber segment events for both monitorable and unmonitorable channels may be correlated to fiber link outage events corresponding to link 305.

Fiber segment events for unmonitorable channels may be used for service level monitoring calculation and notification. Business logic 317 may receive results from network analyzer 309 and determine if an entire link 305 is abnormal according to SLA or policy data retrieved from business rules store 319. Business rules store 319 may store policies, regulations and SLAs for one or more given dark fiber links leased from service provider 301, which may comprise the illustrated exemplary link 305. Business logic 317 may also perform service level monitoring and calculation. According to one embodiment, business logic 317 generates and implements root cause analysis recommendations according to the information retrieved from business rules store 319

Figure 4:
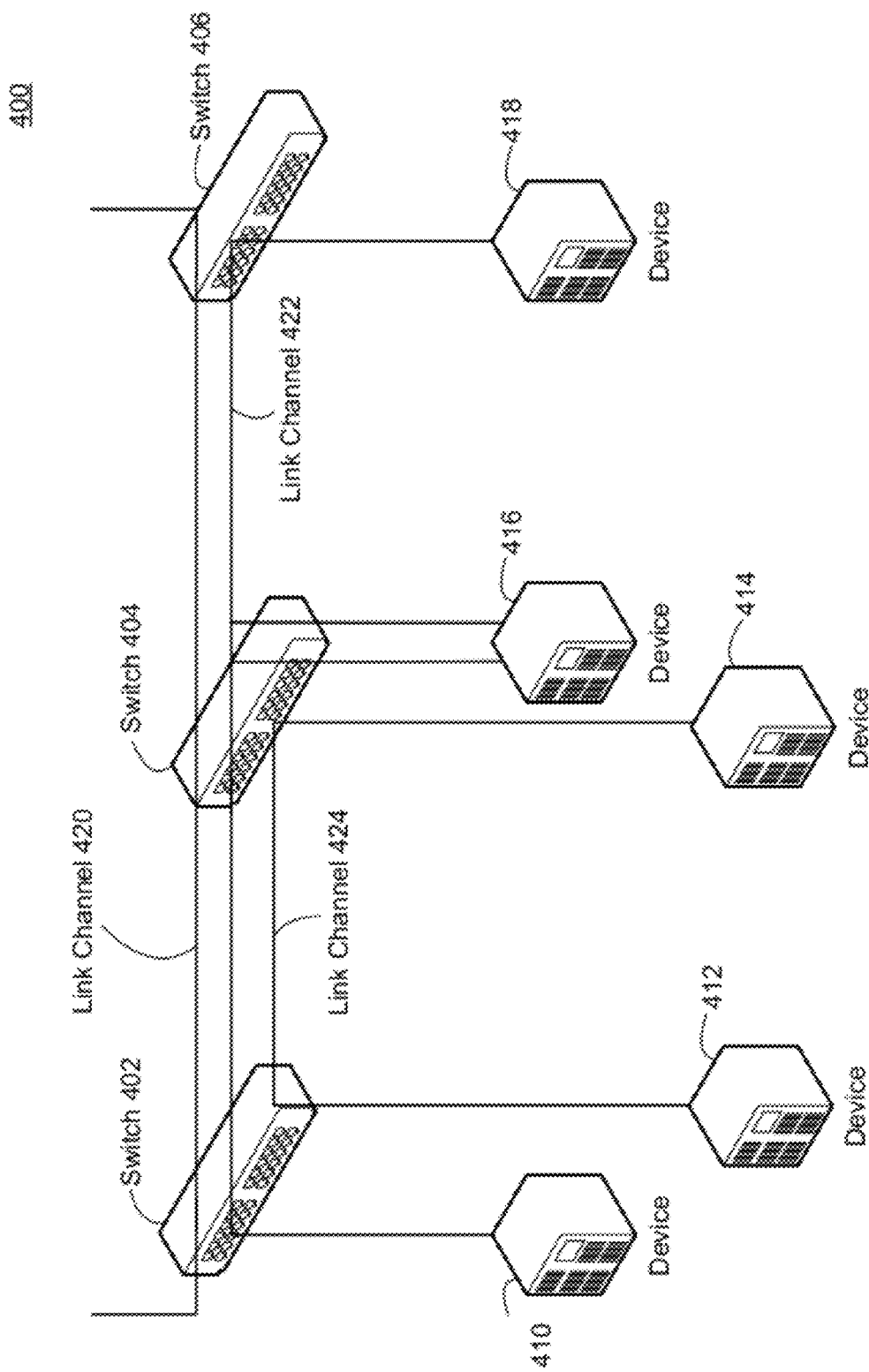
FIG. 4 presents a block diagram illustrating an inferentially monitored network according to one embodiment of the present invention.

FIG. 4 presents a block diagram illustrating an inferential modeling and monitoring of links including switch 402, 404 and 406, devices 410, 412, 414, 416 and 418 and link channel 420, 422 and 424. Link channel 420 may be a channel running through switch 402, 404 and 406. Link channel 422 may be a channel running between device 410, 416 and 418 though switch 402, 404 and 406. Link channel 424 may be a channel between device 412 and 414 through switch 402 and 404. According to one embodiment, link channel 420, 422 and 424 are individual channels within a given fiber link. In one embodiment, link channel 422 is a monitorable channel reserved by a service provider for a given leased dark fiber link. A monitorable channel may be a negligible resource dedicated for use by the service provider and inaccessible by a lessee. Conversely unmonitorable links may be the "actual" leased portions of the given leased fiber link accessible only by the lessee. A given channel may carry a separate transmission within a fiber link.

In one embodiment, link channel 422 may be a monitorable channel or resource used to infer the status of link channel 420 and 424, e.g., the overall resource. Link channel 420 and 424 may be unmonitorable channels used by a lessee of the dark fiber link. For example, a test of link channel 422 indicating a satisfactory connection through switch 402, 404 and 406 may be used to infer that link channel 420 may also have a satisfactory connection running through the same switches. A satisfactory connection may include criteria based on, but not limited to, SLA, bandwidth, connectivity or link quality, etc. In the event that the test of monitorable link channel 422 indicates an unsatisfactory connection, an event may be generated that channel 422 is in an alarm state. Inference of status for link channel 420 and 424 may be made on the basis of RCA techniques, which are described above in detail.

In another embodiment, segments or portions of channel 422 may also be individually monitored. Events may be generated for each channel segment. For example, a test of a segment of link channel 422 between device 416 and 410 through switch 404 and 402 may be conducted. Results of from the test of the segment of link channel 422 may be used to infer the status of link channel 424. Link channels or other resources reserved or held back for monitoring by the service provider may be any channel within a given leased dark fiber link. In an exemplary embodiment, monitorable channels may be monitored through the entirety of a leased fiber link even if the lessee of the link uses only a portion of the leased fiber link. The service provider may have no knowledge of the traffic running through the leased fiber link or the manner in which the lessee is using the leased fiber. A monitorable link that covers the entirety of the leased link may guarantee that service provider is able to detect problems anywhere on the leased link regardless of use by the lessee.

FIG. 5 presents a flow diagram illustrating a method 500 for inferential link monitoring according to one embodiment of the present invention. The method of FIG. 5 may be executed by the systems of FIG. 2 through 4 or any other suitable processing environment. A link is selected for monitoring, step 502. Selection of links for monitoring may be scheduled periodically, in response to a trigger event or on-demand by a system administrator. The link may be a leased dark fiber link with an associated SLA.

After selecting a link, one or more monitorable resources within the link may be identified for monitoring, step 504. The one or more monitorable resources may be a channel, device, component, module, band, frequency, time-slice, or any other partition, portion or sub-assembly of an overall resource accessible by the service provider of the link. Monitorable resources may be analyzed to infer functionality or operating state of unmonitorable resources that are inaccessible by the service provider. In an alternative embodiment, a monitorable resource may be accessible by both the service provider of the link and the lessee of the link. Monitoring of the monitorable resources in alternative embodiments may be performed by either the service provider or the lessee. Specification of the monitoring may be included in a SLA between the service provider and the lessee.

Step 506 includes selecting monitoring criteria for the link. The one or more monitorable resources on the link may be monitored according to specific criteria such as connectivity, throughput, link quality, service quality and availability, etc. Criteria selected for the link may be selected on the basis of anticipated types of traffic for transmission across the monitorable resources or transmitted on the link. The service provider of the leased dark fiber link may want to ensure that the leased dark fiber link complies with policies, regulations or a SLA established with the lessee. The method further includes performing one or more tests on the one or more monitorable resources according to the monitoring criteria, step 508. A given criterion may have one or more specific tests or procedures that may be conducted on the one or more monitorable resources. The one or more test may be any test known to one of ordinary skill in the art that may be performed for evaluating a given link. For example, a test for connectivity of the one or more monitorable resources may be a "ping" test while a test for link quality may be a test for signal and noise.

Results of the one or more tests are analyzed, step 510, which may comprise comparing the results with policies, regulations or SLAs, which may be determined or calculated in advance. A determination may be made as to whether the one or more monitorable resources on the link pass the one or more tests. The one or more tests may generate scores or binary results (e.g., pass or fail). In one embodiment, a determination of whether the one or more monitorable resources pass or fail the one or more tests may be made on the basis of whether the test scores are either above or below a threshold. The threshold may vary on the basis of a specific type of service running on the one or more monitorable resources (e.g., voice, data, video, etc.) As an example, a threshold for link quality may be lower for voice traffic (low quality, low bandwidth requirements) than for HD video traffic (high quality, high bandwidth requirements).

If the one or more monitorable resources do not pass the one or more tests, the link may be abnormal. A determination is made as to whether the link is normal or in a conforming state, step 512. The determination of whether the link is normal includes, but is not limited to, inferring that the remaining channels on a given link, including the unmonitorable resources, are normal. Determining whether the link is normal may include using RCA to determine a root cause of any failed tests. Operation of the link may be inferred on the basis of the RCA of the failed tests and modeling of a topology of the one or more monitorable resources. Inference of the operation of the link may also include correlating the topology of the one or more monitorable resources with a topology of unmonitorable resources within the same link. If the cause of the failed test(s) impacts the overall functionality of the link, the link may be determined as being in a fault or abnormal state. In the event that the link is identified as being in an abnormal state, an alarm on the link is triggered, step 514. The alarm may indicate to a system administrator that a potential problem exists on the link and that attention is needed. Otherwise, the link is determined to be operating normally.

FIG. 6 presents a flow diagram illustrating a method for inferential link monitoring on the basis of multiple known resources according to one embodiment of the present invention. According to the embodiment of FIG. 6, the method 600 comprises selecting a link to monitor, step 602, and identifying a first channel within the link for monitoring, step 604. A service provider of the link may designate one or more channels of a leased link for the purposes of monitoring the link. In one embodiment, the first channel may be one of a plurality of channels accessible by the service provider. Step 606 includes selecting monitoring criteria for the link. A channel on the link may be monitored for a variety of criteria, which may depend on the type of traffic the channel or link may be transmitting.

One or more tests are performed on the first channel in accordance with the monitoring criteria, step 608. The one or more tests may include procedures and tools for testing the functionality of the first channel. In one embodiment, a variety of measurements and modeling of the topology of the first channel are performed. From the one or more tests on the first channel, a determination may be made as to whether to test a second channel, step 610. In one embodiment, the decision to test a second channel may be in response to one or more failed tests on the first channel. A RCA or a precursor to implementing the RCA may require testing of a second channel to determine the extent of a test failure associated with the first channel. In another embodiment, a second channel may be tested in the event that only the first channel is affected by the one or more failed tests.

If a second or subsequent channel does not require testing, results of the one or more tests are analyzed, step 616. Otherwise, where a second channel requires testing, step 610, a second or subsequent channel within the link is identified, step 612, which may be another channel accessible by the service provider. After identifying the second or subsequent channel, one or more tests are performed on the second or subsequent channel, step 614. Performing one or more tests on the second channel may additionally include modeling a topology of the second channel. The one or more tests performed on the second channel may be the same tests performed on the first channel, a different set of one or more tests or additional tests beyond those performed on the first channel.

Results of the one or more tests (from the first channel or from the first and second channel) are analyzed, step 616. Analyzing the results may include determining whether the first and/or second channels on the link pass the one or more tests. On the basis of the analysis, the method 600 determines the status of the link, step 618. The status of the link may be determined according to the results of the tests performed on the first and/or second channel. Passing test results for a first or second channel may be used to infer that the status of the link is normal, where the status of the link also includes the status of the channels on the link other than the first and second channels, e.g., dark or unmonitorable resources. In one embodiment, if both the channels do not pass the one or more tests, the link may be in an alarm or abnormal state. Determining whether the link is normal may include the use of RCA to determine a root cause of any failed tests. Operation of the link may be inferred based on the RCA of the failed tests and modeling of a topology of the first and second channels. Inference of the operation of the link may also include correlating the topology of the first and second channels to a topology of channels inaccessible by the service provider within the same link. If the cause of the failed tests impact functionality of the inaccessible channels, the status of the link may be abnormal, causing the method 600 to alert a system administrator or automated process.

FIG. 7 presents a flow diagram illustrating a method 700 for inferential link and device monitoring according to one embodiment of the present invention. The method 700 comprises selecting a link to monitor, step 702, and identifying one or more monitorable channel paths, step 704. In one embodiment, the one or more monitorable channel paths may be segments of a monitorable channel accessible by the service provider. Step 706 comprises polling one or more devices on the one or more monitorable channel paths, which may include testing, modeling and measuring a topology of the one or more devices on the one or more monitorable channel paths.

Devices and associated connections with issues on the one or more monitorable channel paths are identified, step 708. The devices may include, but are not limited to, routers, switches, modems, system infrastructure or monitoring equipment. Issues may include, but are not limited to, underperforming devices not operating on par with SLA requirements, connectivity issues, power outages, etc. Identification of the devices and associated connections with issues may include identifying the devices and associated connections on the modeled topology of the one or more devices. From the identification of the devices and associated connections with issues, status of the one or more monitorable channel paths are determined, step 710. Determining the status of the one or more monitorable channel paths may include generating one or more events that the one or more channel paths or segments are in an alarm or abnormal state.

The method 700 continues by determining status of one or more unmonitorable channel paths affected by the status of the one or more monitorable channel paths, step 712. In one embodiment, the status of the one or more unmonitorable channel paths is inferred from the status of the one or more monitorable channel paths, which may be made on the basis of RCA. In another embodiment, the modeled topology of the one or more devices of the one or more monitorable channel paths is correlated with an estimated topology of the one or more unmonitorable channel paths. The estimated topology of the one or more unmonitorable channel paths need not include actual components but may be viewed as a "black box." If the issues associated with the devices and associated connections of the one or more monitorable channel paths are determined to impact the functionality of the one or more unmonitorable channel paths, the one or more unmonitorable channel paths may potentially also have issues. In one embodiment, one or more scores or probabilities are generated for use in determining the status of the one or more unmonitorable channel paths. The scores or probabilities may indicate the likelihood that a given unmonitorable channel path has an issue. Determining status of the one or more unmonitorable channel paths may additionally include determining the status of a link containing the one or more monitorable channel paths and the one or more unmonitorable channel paths.

A determination is made of whether there is an issue with the one or more unmonitorable channel paths, step 714. If it is determined that the one or more unmonitorable channel paths do not have issues or are operating in accordance with a normal state, the one or more unmonitorable channel paths are assumed to be operating normally. If there are issues associated with the one or more unmonitorable channels paths, however, an alarm may be triggered indicating an abnormal state on the one or more unmonitorable channel paths, step 716.

FIGS. 1 through 7 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for inferential monitoring of a link, the method comprising:
    selecting a given link to monitor by a service provider, the selected given link including one or more monitorable channels and at least one unmonitorable channel, the unmonitorable channel inaccessible by the service provider;
    performing one or more tests on the one or more monitorable channels;
    determining a status of the one or more monitorable channels on the basis of the one or more tests;
    correlating results from the one or more tests of the one or more monitorable channels to the unmonitorable channel; and
    determining a status of the unmonitorable channel on the basis of the correlation.

2. The method of claim 1 wherein the link is a segment of dark fiber optic cable.

3. The method of claim 1 wherein the link is a voice over internet protocol connection.

4. The method of claim 1 further comprising determining a status of the entirety of the given link on the basis of the correlation.

5. The method of claim 1 further comprising:
    determining a status of a segment of the one or more monitorable channels; and
    determining a status of a segment of the unmonitorable channel corresponding to the segment of the one or more monitorable channels.

6. The method of claim 1 further comprising determining an issue with the one or more monitorable channels.

7. The method of claim 6 further comprising determining an issue with the unmonitorable channel on the basis of the determination of an issue with the one or more monitorable channels.

8. The method of claim 6 further comprising determining an issue with the entirety of the given link on the basis of the determination of an issue with the one or more monitorable channels.

9. The method of claim 1 wherein determining the status of the one or more monitorable channels comprises determining a status of one or more devices connected to the one or more monitorable channels.

10. The method of claim 1 wherein determining the status of the unmonitorable channel comprises the use of a root cause analysis technique.

11. Non-transitory computer readable media comprising program code for execution by a programmable processor that instructs the processor to perform a method for inferential monitoring of a link, the non-transitory computer readable media comprising:
    program code for selecting a given link to monitor by a service provider, the selected given link including one or more monitorable channels and at least one unmonitorable channel, the unmonitorable channel inaccessible by the service provider;
    program code for performing one or more tests on the one or more monitorable channels;

program code for determining a status of the one or more monitorable channels on the basis of the one or more tests;

program code for correlating results from the one or more tests of the one or more monitorable channels to the unmonitorable channel; and program code for determining a status of the unmonitorable channel on the basis of the correlation.

12. The non-transitory computer readable media of claim 11 further comprising program code for determining a status of the entirety of the given link on the basis of the correlation.

13. The non-transitory computer readable media of claim 11 further comprising:

program code for determining a status of a segment of the one or more monitorable channels; and program code for determining a status of a segment of the unmonitorable channel corresponding to the segment of the one or more monitorable channels.

14. The non-transitory computer readable media of claim 11 further comprising program code for determining an issue with the one or more monitorable channels.

15. The non-transitory computer readable media of claim 14 further comprising program code for determining an issue with the unmonitorable channel on the basis of the determination of an issue with the one or more monitorable channels.

16. The non-transitory computer readable media of claim 14 further comprising program code for determining an issue with the entirety of the given link on the basis of the determination of an issue with the one or more monitorable channels.

17. The non-transitory computer readable media of claim 11 wherein program code for determining the status of the one or more monitorable channels comprises program code for determining a status of one or more devices connected to the one or more monitorable channels.

18. The non-transitory computer readable media of claim 11 wherein program code for determining the status of the unmonitorable channel comprises program code to apply a root cause analysis technique.

19. The method of claim 1 wherein determining a status of the one or more monitorable channels on the basis of the one or more tests further comprises determining whether the one or more monitorable channels pass the one or more tests according to a threshold based on a type of service and traffic associated with the one or more monitorable channels.

* * * * *